US012739234B2

(12) United States Patent
Khare et al.

(10) Patent No.: US 12,739,234 B2
(45) Date of Patent: Sep. 15, 2026

(54) APPARATUS, METHOD, AND COMPUTER PROGRAM

(71) Applicant: Nokia Technologies Oy, Espoo (FI)

(72) Inventors: Saurabh Khare, Bangalore (IN); Bruno Landais, Lannion (FR); Apostolos Papageorgiou, Massy (FR)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 18/785,003

(22) Filed: Jul. 26, 2024

(65) Prior Publication Data

US 2025/0039162 A1 Jan. 30, 2025

(30) Foreign Application Priority Data

Jul. 28, 2023 (IN) ............................ 202341050979

(51) Int. Cl.
*H04L 9/40* (2022.01)

(52) U.S. Cl.
CPC .................................. *H04L 63/08* (2013.01)

(58) Field of Classification Search
CPC ....... H04L 63/08; H04L 63/0807; H04L 9/40; H04W 12/068
See application file for complete search history.

(56) References Cited

U.S. PATENT DOCUMENTS

2019/0251241 A1* 8/2019 Bykampadi ......... H04W 12/009
2022/0086734 A1* 3/2022 Aggarwal ........... H04L 63/0884

(Continued)

FOREIGN PATENT DOCUMENTS

IN 202141019531 A 11/2022
KR 20200116844 A 10/2020
WO 2020/238411 A1 12/2020

OTHER PUBLICATIONS

"3rd Generation Partnership Project; Technical Specification Group Services and System Aspects; Security architecture and procedures for 5G system (Release 18)", 3GPP TS 33.501, V18.2.0, Jun. 2023, pp. 1-308.

(Continued)

*Primary Examiner* — Khoi V Le
(74) *Attorney, Agent, or Firm* — Nokia Technologies Oy

(57) ABSTRACT

The disclosure relates to a method comprising to: receiving (700), from a network function service consumer, a request for an access token that authorizes access to a service provided by a network exposure function, wherein the service provides data obtained from an untrusted application function connected to the network exposure function, wherein the request comprises an identifier associated with the network exposure function, an identifier associated with the network function service consumer and an identifier associated with the untrusted application function; determining (702) to provide an access token to the network function service consumer based on the identifier associated with the network exposure function, the identifier associated with the network function service consumer, the identifier associated with the untrusted application function and attributes associated with the untrusted application function included in a profile of the network exposure function stored at the network repository function; and providing (704), to the network function service consumer, the access token comprising the identifier associated with the untrusted application function comprised in the request.

14 Claims, 10 Drawing Sheets

(56) References Cited

U.S. PATENT DOCUMENTS

2022/0338104 A1* 10/2022 Son .......................... H04W 12/06
2022/0353263 A1* 11/2022 Choyi ........................ H04L 12/12
2024/0236080 A1* 7/2024 Kuravangi-Thammaiah ............... H04L 63/0884

OTHER PUBLICATIONS

"3rd Generation Partnership Project; Technical Specification Group Services and System Aspects; Procedures for the 5G System (5GS); Stage 2 (Release 18)", 3GPP TS 23.502, V18.1.1, Apr. 2023, pp. 1-829.

"3rd Generation Partnership Project; Technical Specification Group Core Network and Terminals; 5G System; Network Exposure Function Northbound APIs; Stage 3; (Release 18)", 3GPP TS 29.522, V18.1.0, Mar. 2023, pp. 1-567.

"3rd Generation Partnership Project; Technical Specification Group Core Network and Terminals; T8 reference point for Northbound APIs; (Release 18)", 3GPP TS 29.122, V18.2.0, Jun. 2023, pp. 1-505.

"3rd Generation Partnership Project; Technical Specification Group Core Network and Terminals; 5G System; Network Function Repository Services; Stage 3 (Release 18)", 3GPP TS 29.510, V18.3.0, Jun. 2023, pp. 1-347.

* cited by examiner

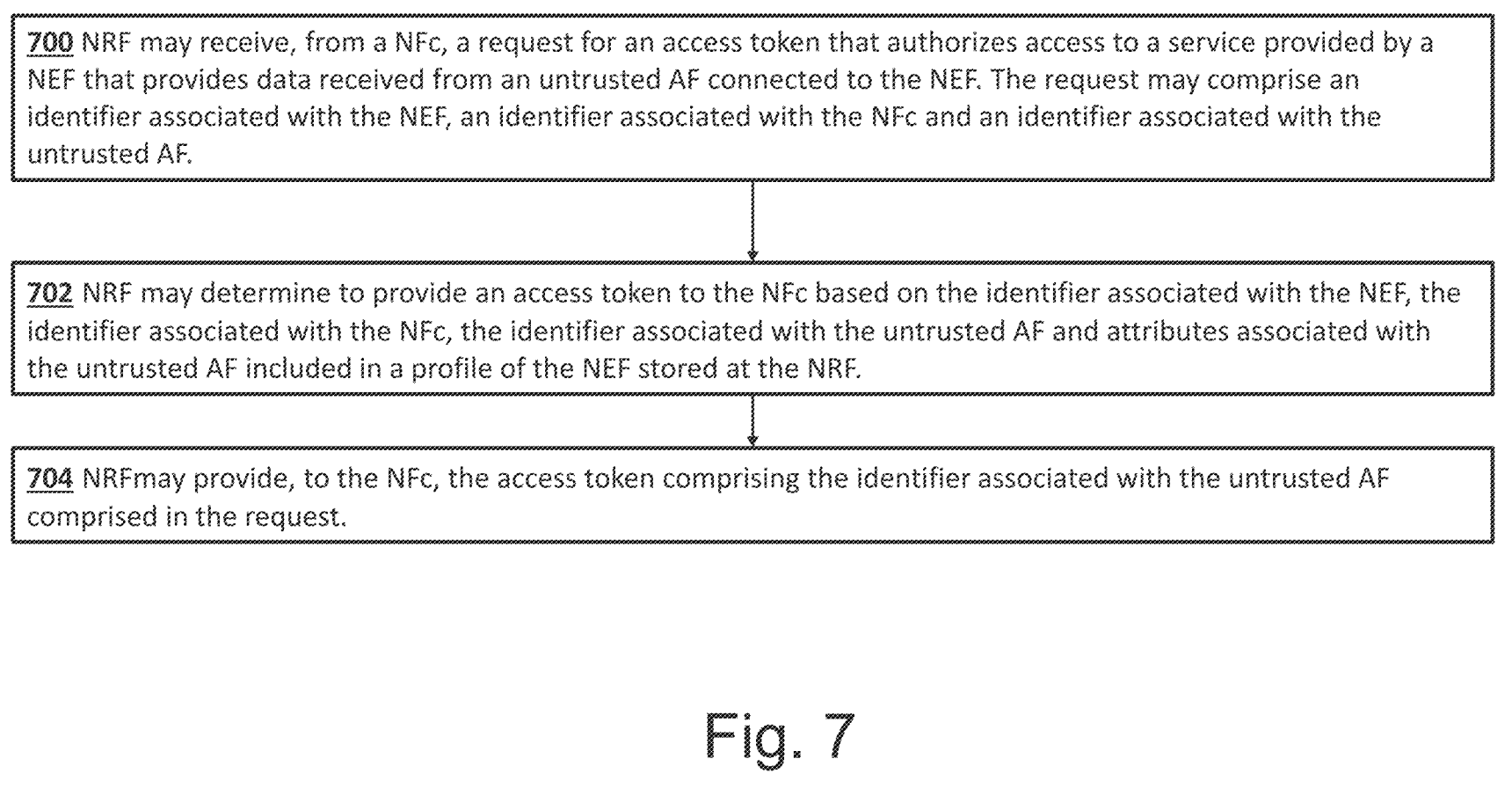

700 NRF may receive, from a NFc, a request for an access token that authorizes access to a service provided by a NEF that provides data received from an untrusted AF connected to the NEF. The request may comprise an identifier associated with the NEF, an identifier associated with the NFc and an identifier associated with the untrusted AF.

702 NRF may determine to provide an access token to the NFc based on the identifier associated with the NEF, the identifier associated with the NFc, the identifier associated with the untrusted AF and attributes associated with the untrusted AF included in a profile of the NEF stored at the NRF.

704 NRFmay provide, to the NFc, the access token comprising the identifier associated with the untrusted AF comprised in the request.

Fig. 7

APPARATUS, METHOD, AND COMPUTER PROGRAM

CROSS-REFERENCE TO RELATED APPLICATIONS

This application claims the benefit of priority of Indian patent application No. 202341050979 filed Jul. 28, 2023, which is hereby incorporated reference.

FIELD

The present disclosure relates to an apparatus, a method, and a computer program for wireless communication systems, and in particular apparatus providing, to a network function service consumer for a wireless communication system, an access token that authorizes access to a service provided by a network exposure function for the wireless communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite-based communication systems and different wireless local networks, for example wireless local area networks (WLAN). The wireless systems can typically be divided into cells and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising at least one processor and at least one memory storing instructions that, when executed by the at least one processor, cause the apparatus at least to: receive, from a network function service consumer, a request for an access token that authorizes access to a service provided by a network exposure function, wherein the service provides data obtained from an untrusted application function connected to the network exposure function, wherein the request comprises an identifier associated with the network exposure function, an identifier associated with the network function service consumer and an identifier associated with the untrusted application function; determine to provide an access token to the network function service consumer based on the identifier associated with the network exposure function, the identifier associated with the network function service consumer, the identifier associated with the untrusted application function and attributes associated with the untrusted application function included in a profile of the network exposure function stored at an network repository function; and provide, to the network function service consumer, the access token comprising the identifier associated with the untrusted application function comprised in the request.

The application function may be an untrusted application function (i.e. the network exposure function may require an access token from the network function service consumer to provide the service that provides the data received from the untrusted application function to the network function service consumer.

The at least one memory may store instructions that, when executed by the at least one processor, cause the apparatus at least to: receive, from the network exposure function, a registration request to register the profile of the network exposure function, the profile of the network exposure function including the attributes associated with the untrusted application function.

The attributes associated with the untrusted application function may comprise: an identifier associated with the untrusted application function; and an identifier associated with a network function that is allowed to access the service corresponding to the identifier associated with the untrusted application function.

The identifier associated with the network function that is allowed to access the service may comprise: an identifier of a network function type of the network function that is allowed to access the service; an identifier of a network function instance of the network function that is allowed to access the service; an identifier of a network function domain of the network function that is allowed to access the service; or an identifier of single network slice selection assistance information that identifies a network slice of network functions that are allowed to access the service.

The identifier associated with the untrusted application function may comprise: an identifier of the untrusted application function; an identifier of an application supported by the untrusted application function; or an identifier of an event relating to the untrusted application function.

The identifier associated with the network exposure function may comprise: an identifier of a network function instance of the network exposure function.

The determining may comprise: determining that the identifier associated with the network function service consumer comprised in the request matches the attributes associated with the untrusted application function included in the profile of the network exposure function; determining that the identifier associated with the untrusted application function comprised in the request matches the attributes associated with the untrusted application function included in the profile of the network exposure function; and determining to provide the access token request.

The at least one memory may store instructions that, when executed by the at least one processor, cause the apparatus at least to: generate the access token comprising the identifier associated with the untrusted application function comprised in the request.

The apparatus may be the network repository function.

According to an aspect there is provided an apparatus comprising means for: receiving, from a network function service consumer, a request for an access token that authorizes access to a service provided by a network exposure function, wherein the service provides data obtained from an untrusted application function connected to the network exposure function, wherein the request comprises an identifier associated with the network exposure function, an identifier associated with the network function service consumer and an identifier associated with the untrusted application function; determining to provide an access token to the network function service consumer based on the identifier associated with the network exposure function, the identifier associated with the network function service consumer, the identifier associated with the untrusted application function and attributes associated with the untrusted application function included in a profile of the network exposure function stored at an network repository function; and providing, to the network function service consumer, the access token comprising the identifier associated with the untrusted application function comprised in the request.

According to an aspect there is provided an apparatus comprising circuitry configured to: receive, from a network function service consumer, a request for an access token that authorizes access to a service provided by a network exposure function that provides data received from an untrusted application function connected to the network exposure function, wherein the request comprises an identifier associated with the network exposure function, an identifier associated with the network function service consumer and an identifier associated with the untrusted application function; determine to provide an access token to the network function service consumer based on the identifier associated with the network exposure function, the identifier associated with the network function service consumer, the identifier associated with the untrusted application function and attributes associated with the untrusted application function included in a profile of the network exposure function stored at an network repository function; and provide, to the network function service consumer, the access token comprising the identifier associated with the untrusted application function comprised in the request.

According to an aspect there is provided a method comprising receiving, from a network function service consumer, a request for an access token that authorizes access to a service provided by a network exposure function, wherein the service provides data obtained from an untrusted application function connected to the network exposure function, wherein the request comprises an identifier associated with the network exposure function, an identifier associated with the network function service consumer and an identifier associated with the untrusted application function; determining to provide an access token to the network function service consumer based on the identifier associated with the network exposure function, the identifier associated with the network function service consumer, the identifier associated with the untrusted application function and attributes associated with the untrusted application function included in a profile of the network exposure function stored at a network repository function; and providing, to the network function service consumer, the access token comprising the identifier associated with the untrusted application function comprised in the request.

The application function may be an untrusted application function (i.e., the network exposure function may require an access token from the network function service consumer to provide the service that provides the data received from the untrusted application function to the network function service consumer.

The method may comprise receiving, from the network exposure function, a registration request to register the profile of the network exposure function, the profile of the network exposure function including the attributes associated with the untrusted application function.

The attributes associated with the untrusted application function may comprise: an identifier associated with the untrusted application function; and an identifier associated with a network function that is allowed to access the service corresponding to the identifier associated with the untrusted application function.

The identifier associated with the network function that is allowed to access the service may comprise: an identifier of a network function type of the network function that is allowed to access the service; an identifier of a network function instance of the network function that is allowed to access the service; an identifier of a network function domain of the network function that is allowed to access the service; or an identifier of single network slice selection assistance information that identifies a network slice of network functions that are allowed to access the service.

The identifier associated with the untrusted application function may comprise an identifier of the untrusted application function; an identifier of an application supported by the untrusted application function; or an identifier of an event relating to the untrusted application function.

The identifier associated with the network exposure function may comprise an identifier of a network function instance of the network exposure function.

The determining may comprise: determining that the identifier associated with the network function service consumer comprised in the request matches the attributes associated with the untrusted application function included in the profile of the network exposure function; determining that the identifier associated with the untrusted application function comprised in the request matches the attributes associated with the untrusted application function included in the profile of the network exposure function; and determining to provide the access token request.

The method may comprise generating the access token comprising the identifier associated with the untrusted application function comprised in the request.

The method may be performed by the network repository function.

According to an aspect there is provided a computer program comprising computer executable code which when run on at least one processor is configured to: receive, from a network function service consumer, a request for an access token that authorizes access to a service provided by a network exposure function that provides data received from an untrusted application function connected to the network exposure function, wherein the request comprises an identifier associated with the network exposure function, an identifier associated with the network function service consumer and an identifier associated with the untrusted application function; determine to provide an access token to the network function service consumer based on the identifier associated with the network exposure function, the identifier associated with the network function service consumer, the identifier associated with the untrusted application function and attributes associated with the untrusted application function included in a profile of the network exposure function stored at an network repository function; and provide, to the network function service consumer, the access token comprising the identifier associated with the untrusted application function comprised in the request.

According to an aspect there is provided an apparatus comprising at least one processor and at least one memory storing instructions that, when executed by the at least one processor, cause the apparatus at least to: receive, from a network function service consumer, a request to be provided a service by a network exposure function that provides data received from an untrusted application function connected to the network exposure function, wherein the request comprises an access token comprising an identifier associated with the untrusted application function; determine to allow the request based on the access token; and provide, to the network function service consumer, the service.

The at least one memory may store instructions that, when executed by the at least one processor, cause the apparatus at least to: identify the untrusted application function based on the identifier associated with the untrusted application function comprised in the access token; providing, to the application function, a request to be provided data from the untrusted application function; receive, from the untrusted application function, data; and provide, to the network function service consumer, the service that provides the data received from the untrusted application function.

At least one memory storing instructions that, when executed by the at least one processor, cause the apparatus at least to: provide, to a network repository function, a registration request to register a profile of the network exposure function, the profile of the network exposure function including attributes associated with the untrusted application function.

The apparatus may be a network exposure function.

According to an aspect there is provided an apparatus comprising means for: receiving, from a network function service consumer, a request to be provided a service by a network exposure function that provides data received from an untrusted application function connected to the network exposure function, wherein the request comprises an access token comprising an identifier associated with the untrusted application function; and determining to allow the request based on the access token providing, to the network function service consumer, the service.

According to an aspect there is provided an apparatus comprising circuitry configured to: receive, from a network function service consumer, a request to be provided a service by a network exposure function that provides data received from an untrusted application function connected to the network exposure function, wherein the request comprises an access token comprising an identifier associated with the untrusted application function; determine to allow the request based on the access token; and provide, to the network function service consumer, the service.

According to an aspect there is provided a method comprising: receiving, from a network function service consumer, a request for a service provided by a network exposure function, wherein the service provides data obtained from an untrusted application function connected to the network exposure function, wherein the request comprises an access token comprising an identifier associated with the untrusted application function; determining to allow the request based on the access token; and providing, to the network function service consumer, the data obtained from an untrusted application function.

The method may comprise identifying the untrusted application function based on the identifier associated with the untrusted application function comprised in the access token; providing, to the untrusted application function, a request to be provided data from the untrusted application function; receiving, from the untrusted application function, data; and providing, to the network function service consumer, the service that provides the data received from the untrusted application function.

The method may comprise providing, to a network repository function, a registration request to register a profile of the network exposure function, the profile of the network exposure function including attributes associated with the untrusted application function.

The method is performed by a network exposure function.

According to an aspect there is provided a computer program comprising computer executable code which when run on at least one processor is configured to: receive, from a network function service consumer, a request to be provided a service by a network exposure function, wherein the service provides data obtained from an untrusted application function connected to the network exposure function, wherein the request comprises an access token comprising an identifier associated with the untrusted application function; determine to allow the request based on the access token; and provide, to the network function service consumer, the data obtained from an untrusted application function.

According to an aspect there is provided an apparatus comprising at least one processor and at least one memory storing instructions that, when executed by the at least one processor, cause the apparatus at least to: generate a request for an access token that authorizes access to a service provided by a network exposure function, wherein the serviced provides data received from an untrusted application function connected to the network exposure function, wherein the request comprises an identifier associated with the network exposure function, an identifier associated with the network function service consumer and an identifier associated with the untrusted application function; provide, to a network repository function, the request; and receive, from the network repository function, an access token comprising the identifier associated with the untrusted application function comprised in the request.

The request may cause the network repository function to determine to provide the access token based on the identifier associated with the network exposure function, the identifier associated with the network function service consumer, the identifier associated with the untrusted application function and attributes associated with the untrusted application function included in a profile of the network exposure function stored at the network repository function.

The identifier associated with the application function may comprise: an identifier of the untrusted application function; an identifier of an application of the untrusted application function; or an identifier of an event of the untrusted application function.

The at least one memory may store instructions that, when executed by the at least one processor, cause the apparatus at least to may comprise: generate a request to be provided a service by the network exposure function that provides data received from the untrusted application function connected to the network exposure function, wherein the request comprises the access token including an identifier associated with the untrusted application function; provide, to the network exposure function, the request; and receive, form the network exposure function, the service.

The apparatus may be a network function service consumer.

According to an aspect there is provided an apparatus comprising means for: generating a request for an access token that authorizes access to a service provided by a network exposure function, wherein the service provides data received from an untrusted application function connected to the network exposure function, wherein the request comprises an identifier associated with the network exposure function, an identifier associated with the network function service consumer and an identifier associated with the untrusted application function; providing, to a network repository function, the request; and receiving, from the network repository function, an access token comprising the identifier associated with the untrusted application function comprised in the request.

According to an aspect there is provided an apparatus comprising circuitry configured to: generate a request for an access token that authorizes access to a service provided by a network exposure function, wherein the service provides data obtained from an untrusted application function connected to the network exposure function, wherein the request comprises an identifier associated with the network exposure function, an identifier associated with the network function service consumer and an identifier associated with the untrusted application function; provide, to a network repository function, the request; and receive, from the network repository function, an access token comprising the identifier associated with the untrusted application function comprised in the request.

According to an aspect there is provided a method comprising: generating a request for an access token that authorizes access to a service provided by a network exposure function, wherein the service provides data received from an untrusted application function connected to the network exposure function, wherein the request comprises an identifier associated with the network exposure function, an identifier associated with the network function service consumer and an identifier associated with the untrusted application function; providing, to a network repository function, the request; and receiving, from the network repository function, an access token comprising the identifier associated with the untrusted application function comprised in the request.

The request may cause the network repository function to determine to provide the access token based on the identifier associated with the network exposure function, the identifier associated with the network function service consumer, the identifier associated with the untrusted application function and attributes associated with the untrusted application function included in a profile of the network exposure function stored at the network repository function.

The identifier associated with the application function may comprise an identifier of the untrusted application function; an identifier of an application of the untrusted application function; or an identifier of an event of the untrusted application function.

The method may comprise generating a request for a service provided by the network exposure function, wherein the service provides data obtained from the untrusted application function connected to the network exposure function, wherein the request comprises the access token including an identifier associated with the untrusted application function; providing, to the network exposure function, the request; and receiving, from the network exposure function, the data obtained from the untrusted application function.

The method may be performed by a network function service consumer.

According to an aspect there is provided a computer program comprising computer executable code which when run on at least one processor is configured to: generate a request for an access token that authorizes access to a service provided by a network exposure function, wherein the service provides data received from an untrusted application function connected to the network exposure function, wherein the request comprises an identifier associated with the network exposure function, an identifier associated with the network function service consumer and an identifier associated with the untrusted application function; provide, to a network repository function, the request; and receive, from the network repository function, an access token comprising the identifier associated with the untrusted application function comprised in the request.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access and Mobility Management Function
API: Application Programming Interface
BS: Base Station
CU: Centralized Unit
DL: Downlink
DU: Distributed Unit
gNB: gNodeB
GSM: Global System for Mobile communication
HSS: Home Subscriber Server
IE: Information Element
IoT: Internet of Things
LMF: Location Management Function
LPP: Location Positioning Protocol
LTE: Long Term Evolution
MAC: Medium Access Control
ML: Machine Learning
MS: Mobile Station
MTC: Machine Type Communication
NEF: Network Exposure Function
NF: Network Function
NFc: Network Function consumer
NFp: Network Function producer
NR: New radio
NRF: Network Repository Function
NWDAF: Network Data Analytics Function
PDU: Packet Data Unit
RAM: Random Access Memory
(R)AN: (Radio) Access Network
ROM: Read Only Memory
SBA: Service Based Architecture
SINR: Signal to Interference plus Noise Ratio
SMF: Session Management Function
S-NSSAI: Single Network Slice Selection Assistance Information
TR: Technical Report
TS: Technical Specification
UE: User Equipment
UMTS: Universal Mobile Telecommunication System 3GPP: 3rd Generation Partnership Project
5G: 5th Generation
5GC: 5G Core network
5GS: 5G System

BRIEF DESCRIPTION OF THE FIGURES

Embodiments will now be described, by way of example only, with reference to the accompanying Figures in which:

FIG. 7 shows a method for process for providing, to a network function service consumer, an access token that authorizes access to a service provided by a network exposure function, wherein the method is performed by a network repository function;

DETAILED DESCRIPTION OF THE FIGURES

In the following certain embodiments are explained with reference to communication devices capable of communication via a wireless communication system (e.g., a cellular system or a mobile communication system) serving such communication devices. Before explaining in detail the exemplifying embodiments, certain general principles of a wireless communication system, access systems thereof, and communication devices are briefly explained with reference to FIG. 1, FIG. 2 and FIG. 3 to assist in understanding the technology underlying the described examples. In the following description, the terms communication device and user equipment may be interchanged.

Figure 1:
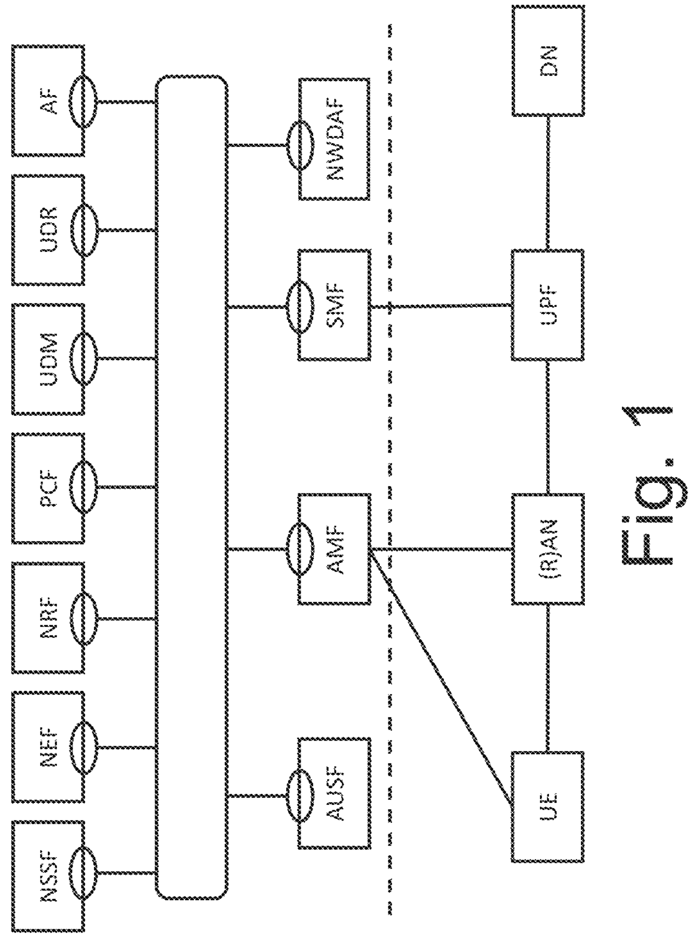
FIG. 1 shows a schematic representation of a 5G system.

FIG. 1 shows a schematic representation of a communication network. The communication network may comprise a public land mobile network (PLMN). A PLMN may comprise a user equipment (UE), a wireless communication system comprising a (radio) access network ((R)AN), a core network (5GC), one or more application functions (AF) and one or more data networks (DN).

A 5G (R)AN may comprise one or more base stations. A base station may be an evolved NodeB (eNB) or a gNodeB (gNB). A gNB may comprise distributed units connected to one or more centralized units.

A 5GC may comprise an access and mobility management function (AMF), a session management function (SMF), an authentication server function (AUSF), a user data management (UDM), a user plane function (UPF), a network exposure function (NEF), a unified data repository (UDR), an application function (AF), a network repository function (NRF) and/or a network data analytics function (NWDAF). An AF is a control plane function that provides (i.e., supports) application services. For example, the AF may be an application function hosted on an application server that is connected to the 5GC. The AF may provide an application service, such as a video streaming service to UEs via the 5GC that connects the UEs to the application server hosting the AF.

A 5GC may be based on a service-based architecture (SBA) centred around network function (NF) services. A NF may be an NF service producer (NFp). A NF may be an NF service consumer (NFc). In the following description the term NFc and client may be interchanged. A NFp may register its NF profile with the NRF. The profile of a NFp may comprise information about the NFp and the services provided by the NFp. A NFp may be discovered by a NFc via the NRF. A NFp may require an access token (e.g., JSON Web Token) from the NFc before providing a service to the NFc. The access token may be provided to the NFc by the NRF or an OAuth2 Authorization Server.

In some embodiments, a NWDAF may be a NFc and NEF may be a NFp. The NEF may provide a service that provides data received from an untrusted AF connected to the NEF of the 5GC, the NEF may require an access token from the NWDAF (e.g, the NFp) to provide the service to the NWDAF.

The NWDAF may provide, to the NRF or OAuth2 Authorization Server, a request for an access token that authorizes access to the service provided by the NEF. The NRF or OAuth2 authorization server may authorize access to the service provided by the NEF based on NEF authorization policy. The NRF or OAuth2 authorization server may provide an access token to the NWDAF.

Figure 2:
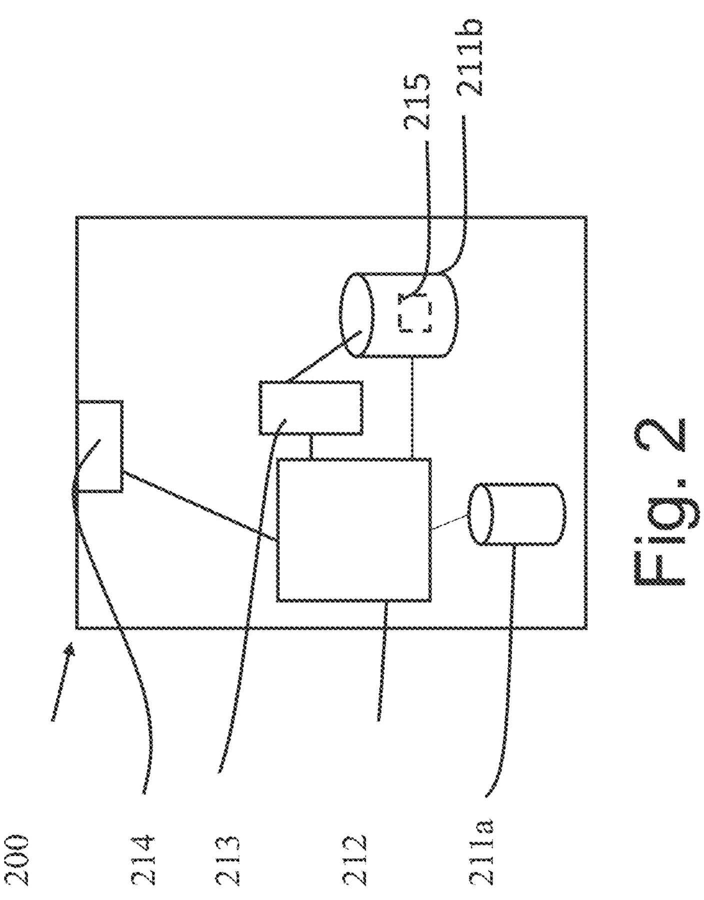
FIG. 2 shows a schematic representation of a control apparatus.

FIG. 2 illustrates an example of a control apparatus 200 for controlling a function of the (R)AN illustrated in FIG. 1. The control apparatus 200 may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each (R)AN comprises a control apparatus 200. In alternative embodiments, two or more (R)ANs may share a control apparatus.

Figure 3:
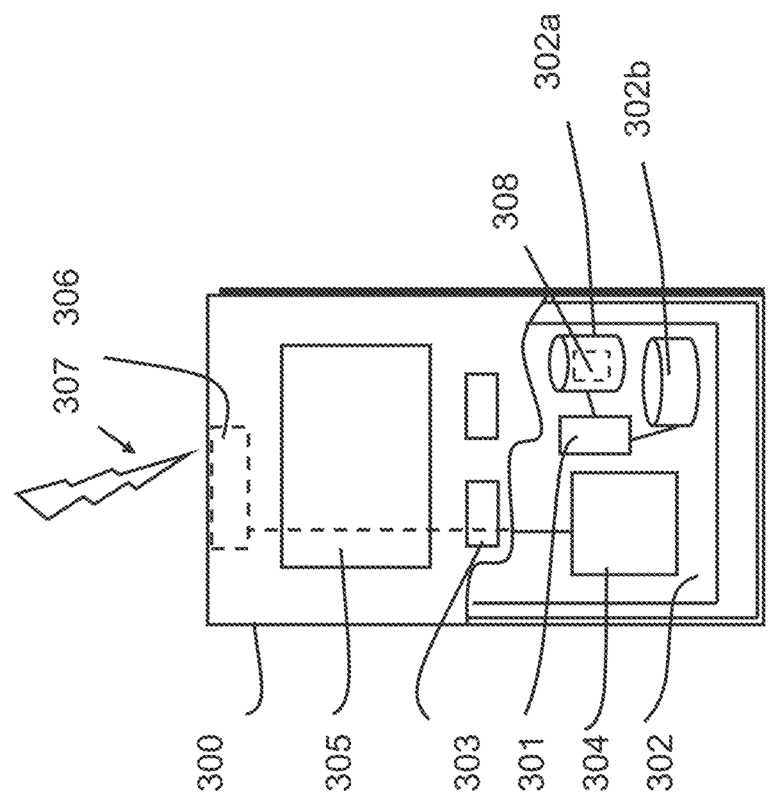
FIG. 3 shows a schematic representation of a user equipment.

FIG. 3 illustrates an example of a UE 300, such as the UE illustrated on FIG. 1. The UE 300 is a communication device that is capable of (or configured for) sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The UE 300 may provide, for example, communication of data for carrying communications. The communications may be one or more of voice, electronic mail (email), text message, multimedia, data, machine data and so on.

The UE 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The UE 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

A limitation with existing solutions for authorizing a UE to access a service provided by the NEF for AFs connected to the NEF is that the NRF or OAuth2 authorization server may authorize access to the service provided by the NEF for all AFs connected to the NEF. The NRF or OAuth2 authorization server may not authorize access to the service provided by the NEF for a specific AF connected to the NEF, for a specific application supported by an AF connected to the NEF or for a specific event relating to an AF connected to the NEF.

Figure 4:
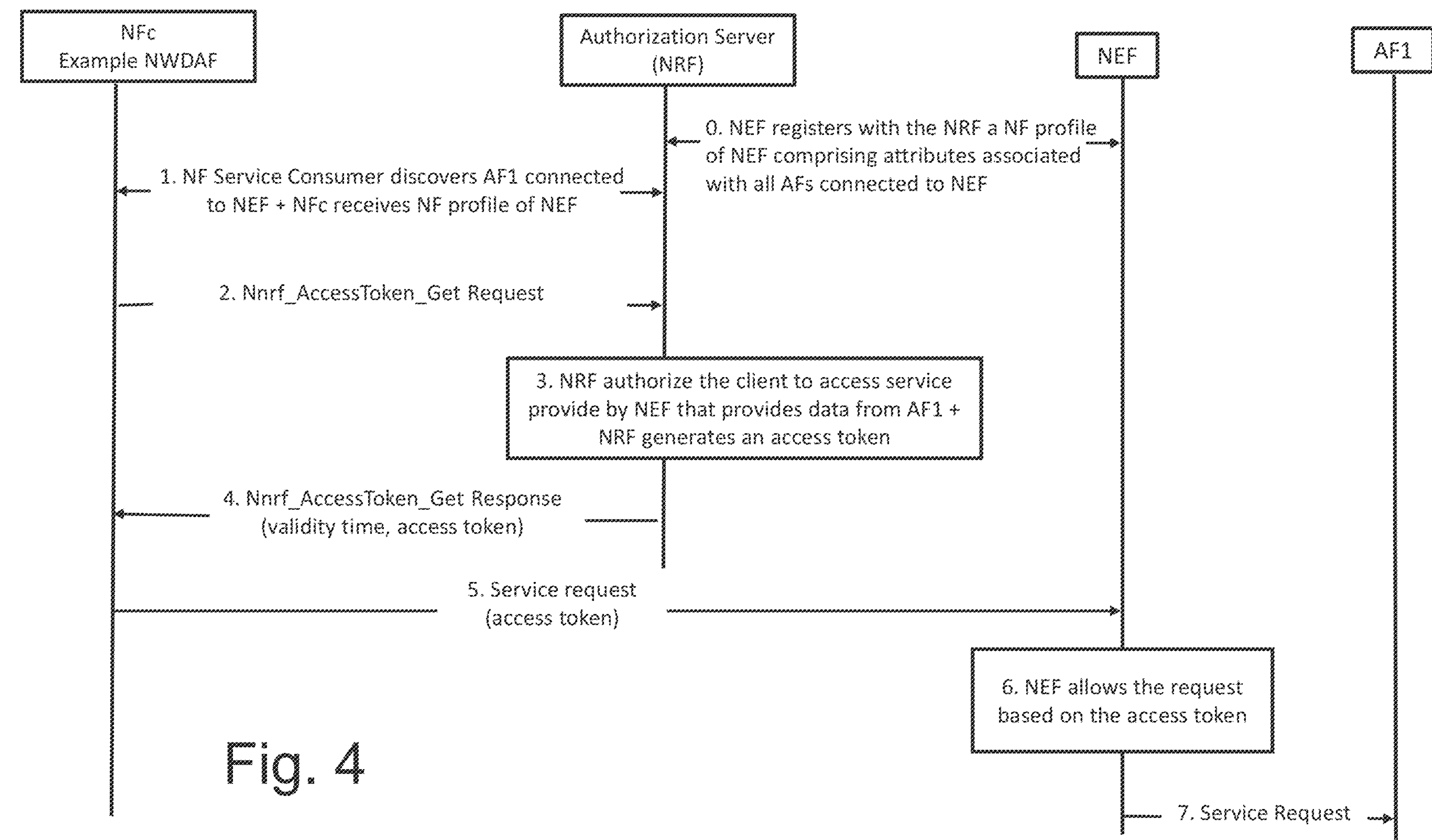
FIG. 4 shows a signalling diagram of a process for providing, to a network function service consumer, an access token that authorizes access to a service provided by a network exposure function using data from application functions connected to the network exposure function.

FIG. 4 shows a process for providing, to a Nfc, an access token that authorizes access to a service provided by a NEF that provides data received from AFs connected to the NEF.

At step 0, a NEF may send to a NRF, a registration request to register a profile of the NEF. The profile of the NEF may include attributes associated with all AFs connected to the NEF. The AFs may be untrusted AFs. The AFs may include AF1 and AF2 (not illustrated).

At step 1, a NFc may send, to the NRF, a request to discover the AFs connected to the NEF.

At step 2, the NFc may send, to the NRF, a request for an access token that authorizes access to a service provided by the NEF that provides data received from the AFs. The request for an access token that authorizes access to a service provided by a NEF that provides data from the AFs may be a Nnfr_AccessToken_Get Request as shown in FIG. 4.

At step 3, the NRF may authorize the NFc to access the service provided by the NEF that provides data received from the AFs based on NEF authorization policy.

At step 4, the NRF may provide, to the NFc, a response to the request for an access token that authorizes access to a service provided by the NEF that provides data from the AFs. The response comprises an access token for the NFc. The response may also comprise a validity time associated with the access token for the NFc. The validity time associated with the access token for the NFc indicates a time that the access token for the NFc is valid. For example, the validity time associated with the access token for the NFc indicates that the access token for the NFc is valid N seconds, N minutes, N hours or N days, wherein N is an integer.

The response comprising the access token may be a Nnrf_Access_Token_Get Response as shown in FIG. 4.

At step 5, the NFc may provide, to the NEF, a request for the service provided by the NEF that provides data received from the AFs. The request may comprise the access token.

At step 6, the NEF may determine to allow the request based on the access token.

At step 7, the NEF may send, to the AFs, a service request for a service provided by the AF (e.g., produced and exposed by the AF), where the service provided by the AFs obtains and provides data to the NEF.

A limitation of the process described above is that the NRF may authorize a NFc to access a service provided by the NEF for all AFs connected to the NEF (i.e., AF1 and AF2). Hence, the NRF is not capable of authorizing a NFc to access a service provided by the NEF for a specific AF. Therefore, there is a need for an NRF to authorize a NFc to access a service provided by the NEF with a finer granularity that the process described with reference to FIG. 4. In particular, there is a need for an NRF to authorize a NFc to access a service provided by the NEF for a specific untrusted AF connected to the NEF, for a specific application of an untrusted AF connected to the NEF or a specific event relating to an untrusted AF connected to the NEF.

According to an aspect of this disclosure, there is provided a NEF that authorizes access to a service provided by the NEF, where the service provides data obtained from a specific untrusted AF connected to the NEF, wherein the data obtained from the specific untrusted AF is data received the specific untrusted AF, data received from a specific application of an untrusted AF connected to the NEF or data associated with a specific event relating to an untrusted AF connected to the NEF.

According to one or more aspect of this disclosure, the NEF may send, to a NRF, a registration request to register a profile of the NEF. The profile of the NEF may include attributes associated with untrusted AFs connected to the NEF.

It will be understood that the profile of the NEF may correspond to the datatype "NefInfo" described in 3GPP TS 29.510 v18.3.0, section 6.1.6.2.48). That is, attributes included in the profile of the NEF may comprise attributes included in the datatype "NefInfo". The attributes associated with the AFs may correspond to the datatype "afEeData" or the datatype "pfdData" described in 3GPP TS 29.510 v18.3.0, section 6.1.6.2.50 and section 6.1.6.2.49.

Attributes associated with the untrusted AFs may comprise identifiers associated with the untrusted AFs. The identifiers associated with the untrusted AFs may comprise identifiers of the untrusted AFs (generally referred to as "AfIds"), identifiers of applications supported by the untrusted AFs (generally referred to herein as "appIds") or identifiers of events relating to the untrusted AFs (generally referred to herein as "afEvents").

It will be understood that although this disclosure refers to "attributes", the term "attributes" may be interchanged with "information" or "information elements".

Advantageously, the attributes associated with the untrusted AFs may comprise identifiers associated with a NF that is allowed to access a service provided by the NEF. The identifiers associated with a NF that is allowed to access a service provided by the NEF may correspond to the identifiers associated with the untrusted AFs. For example, each identifier associated with a NF that is allowed to access a service provided by the NEF corresponds to one or more identifiers associated with an AF.

The identifiers associated with a NF that is allowed to access a service provided by the NEF that provides data received from an untrusted AF may comprise an identifier of a NF type of a NF that is allowed to access a service provided by the NEF (generally referred to herein as allowedNFtypes"), an identifier of a NF instance of a NF that is allowed to access a service provided by the NEF (generally referred to herein "allowedNFInstances"), an identifier of a NF domain of a NF that is allowed to access a service provided by the NEF (generally referred to herein "allowedNFDomains") or an identifier of a single network slice selection assistance information (S-NSSAI) that identifies a network slice of a NF that is allowed to access a service provided by the NEF (generally referred to as "allowedNssais)".

The attributes associated with the untrusted AFs included in the profile of the NEF may be used by the NFc to determine whether the NFc will be provided, by the NRF, an access token that authorizes access to a service provided by the NEF that provides data received from a specific untrusted AF connected to the NEF, a specific application supported by an untrusted AF connected to the NEF or a specific event relating to an untrusted AF connected to the NEF.

The attributes associated with the untrusted AFs in the profile of the NEF may be used by the NRF to determine whether to provide, to the NFc, an access token that authorizes access to a service provided by the NEF that provides data received from a specific untrusted AF connected to the NEF, a specific application supported by an untrusted AF connected to the NEF or a specific event relating to an untrusted AF connected to the NEF.

As explained above the profile of the NEF may be a data type referred to as "NefInfo". The attributes associated with the AFs may be a data type referred to as "afEeData" or a data type referred to as "PfdData".

The data type "NefInfo" may be defined as follows.

| Attribute name | Data type | P | Cardinality | Description |
|---|---|---|---|---|
| nefId | NefId | C | 0 . . . 1 | This IE shall be present and contain the NEF ID of the NEF if NIDD service is supported. |
| pfdData | PfdData | O | 0 . . . 1 | PFD data, containing the list of internal application identifiers and/or the list of application function identifiers for which the PFDs can be provided.<br>Absence of this attribute indicates that the PFDs for any internal application identifier and for any application function identifier can be provided. |
| afEeData | AfEvent ExposureData | O | 0 . . . 1 | The AF provided event exposure data. The NEF registers such information in the NRF on behalf of the AF. |
| gpsiRanges | array(Identity Range) | O | 1 . . . N | Range(s) of External Identifiers |
| external Group IdentifiersRanges | array(Identity Range) | O | 1 . . . N | Range(s) of External Group Identifiers |
| servedFqdnList | array(string) | O | 1 . . . N | Pattern (regular expression according to the ECMA-262 dialect [8]) representing the Domain names served by the NEF |

The data type "afEeData" may be defined as follows.

| Attribute name | Data type | P | Cardinality | Description |
|---|---|---|---|---|
| afEvents | array(AfEvent) | M | 1 . . . N | AF Event(s) exposed by the NEF after registration of the AF(s) at the NEF. |
| afIds | array(string) | O | 1 . . . N | Associated AF identifications to the AfEvents. The absence of this attribute indicate that the NEF can be selected for any AF. |
| appIds | array(string) | O | 1 . . . N | The list of Application ID(s) the AF(s) connected to the NEF supports. The absence of this attribute indicate that the NEF can be selected for any Application. |
| taiList | array(Tai) | O | 1 . . . N | This IE may be present if the AfEvent is set to "GNSS_ASSISTANCE_DATA". When present, this IE shall contain the list of TAIs the trusted AF can serve. It may contain one or more non-3GPP access TAIs. The absence of this attribute and the taiRangeList attribute indicate that the trusted AF can be selected for any TAI in the serving network. |
| taiRangeList | array(TaiRange) | O | 1 . . . N | This IE may be present if the AfEvent is set to "GNSS_ASSISTANCE_DATA". When present, this IE shall contain the range of TAIs the trusted AF can serve. It may contain non-3GPP access TAIs. The absence of this attribute and the taiList attribute indicate that the trusted AF can be selected for any TAI in the serving network. |
| allowedNfType | array(NFType) | O | 1 . . . N | Type of the NFs allowed to access AF event IDs. AF IDs, and/or App IDs defined in this entry. The absence of this attribute indicates that any NF type is allowed to access AF event IDs, AF IDs, and/or App IDs defined in this entry. |
| allowedNfInstance | array(nfInstanceId) | O | 1 . . . N | NF Instances of the NFs allowed to access AF event IDs, AF IDs, and/or App IDs defined in this entry. The absence of this attribute indicates that any NF type is allowed to access AF event IDs, AF IDs, and/or App IDs defined in this entry. |
| allowedNfDomains | array(string) | O | 1 . . . N | Domains of the NFs allowed to access AF event IDs. AF IDs, and/or App IDs defined in this entry. The absence of this attribute indicates that any NF type is allowed to access AF event IDs, AF IDs, and/or App IDs defined in this entry. |
| allowedNssais | array(ExtSnssai) | O | 1 . . . N | S-NSSAIs of the NFs allowed to access AF event IDs. AF IDs, and/or App IDs defined in this entry. The absence of this attribute indicates that any NF type is allowed to access AF event IDs, AF IDs, and/or App IDs defined in this entry. |

The underlined attributes may be added to TS 29.510 v18.3.0 (section 6.1.6.2.50).

The data type "PfdData" may be as follows.

| Attribute name | Data type | P | Cardinality | Description |
|---|---|---|---|---|
| appIds | array(string) | O | 1 . . . N | List of internal application identifiers of the managed PFDs. |
| afIds | array(string) | O | 1 . . . N | List of application function identifiers of the managed PFDs. |
| allowedNfTypes | array(NFType | O | 1 . . . N | Type of the NFs allowed to access App IDs or AF IDs (where App IDs or AF IDs are keys of the map) The absence of this attribute indicates that any NF type is allowed to access App IDs or AF IDs. |

-continued

| Attribute name | Data type | P | Cardinality | Description |
|---|---|---|---|---|
| allowedNfInstances | array (nfInstanceId) | O | 1 . . . N | NF instance id of the NFs allowed to access App IDs or AF IDs (where App IDs or AF IDs are keys of the map) The absence of this attribute indicates that any NF Instance is allowed to access App IDs or AF IDs. |
| allowedNfDomains | array(string) | O | 1 . . . N | domain of the NFs allowed to access App IDs or AF IDs (where App IDs or AF IDs are keys of the map) The absence of this attribute indicates that any domain is allowed to access App IDs or AF IDs. |

The underlined attributes may be added to TS 29.510 v18.3.0 (section 6.1.6.2.49).

According to one or more aspects of this disclosure, a NFc may send, to the NRF, a request to discover an untrusted AF connected to a NEF. The NRF may send, to the NFc, the profile of the NEF. The profile of the NEF may include attributes associated with all untrusted AFs connected to the NEF. Attributes associated with the untrusted AFs may comprise identifiers associated with the untrusted AFs. The identifiers associated with the untrusted AFs may comprise identifiers of the untrusted AFs (e.g. "AfIds"), identifiers of applications supported by the AFs (e.g. "appIds") or identifiers of events relating to the untrusted AFs (e.g. "afEvents"). In this way, the NFc may obtain identifiers associated with the untrusted AF.

According to one or more aspect of this disclosure, a NFc may send a request for an access token that authorizes access to a service provided by a NEF that provides data received from an untrusted AF connected to the NEF. The request comprises an identifier associated with the untrusted AF.

The request for an access token that authorizes access to a service provided by a NEF that provides data received from an untrusted AF connected to the NEF to the NFc may be the data type "AccessTokenReq" as described in 3GPP TS 29.510 v18.3.0 (section 6.3.5.2.2).

The data type "AccessTokenReq" may be as follows.

| Attribute name | Data type | P | Cardinality | Description |
|---|---|---|---|---|
| grant_type | string | M | 1 | This IE shall contain the grant type as "client_credentials" Enum: "client_credentials" |
| nfInstanceId | NfInstanceId | M | 1 | This IE shall contain the NF instance id of the NF service consumer. |
| nfType | NFType | C | 0 . . . 1 | This IE shall be included when the access token request is for an NF type and not for a specific NF/NF service instance. When present, this IE shall contain the NF type of the NF service consumer. (NOTE 3) |
| targetNfType | NFType | C | 0 . . . 1 | This IE shall be included when the access token request is for an NF type and not for a specific NF/NF service instance. When present, this IE shall contain the NF type of the NF service producer. |
| scope | string | M | 1 | This IE shall contain the scopes requested by the NF service consumer. The scopes shall consist of a list of NF service name(s) of the NF service producer(s) or resource/operation-level scopes defined by each service API, separated by whitespaces, as described in IETF RFC 6749 [16], clause 3.3. The service name(s) included in this attribute shall be any of the services defined in the ServiceName enumerated type (see clause 6.1.6.3.11). The resource/operation-level scopes shall be any of those defined in the "securitySchemes" clause of each service API. pattern: '^([a-zA-Z0-9_:-]+)( [a-zA-Z0-9_:-]+)*$' See NOTE 2. |

-continued

| Attribute name | Data type | P | Cardinality | Description |
|---|---|---|---|---|
| targetNfInstanceId | NfInstanceId | C | 0 . . . 1 | This IE shall be included, if available and if it is an access token request for a specific NF Service Producer. When present this IE shall contain the NF Instance ID of the specific NF Service Producer for which the access token is requested. |
| requesterPlmn | PlmnId | C | 0 . . . 1 | This IE shall be included when the NF service consumer in one PLMN requests a service access authorization for an NF service producer from a different PLMN. When present, this IE shall contain the PLMN ID of the requester NF service consumer. (NOTE 3) (NOTE 4) |
| requesterPlmnList | array(PlmnId) | C | 2 . . . N | This IE shall be included when the NF service consumer serving a PLMN, with more than one PLMN ID, requests a service access authorization for an NF service producer from a different PLMN. When present, this IE shall contain the PLMN IDs of the requester NF service consumer. (NOTE 4) |
| requesterSnssaiList | array(Snssai) | O | 1 . . . N | When present, this IE shall contain the list of S-NSSAIs of the requester NF service consumer. This may be used by the NRF to validate that the requester NF service consumer is allowed to access the target NF Service Producer. (NOTE 3) |
| requesterFqdn | Fqdn | O | 0 . . . 1 | When present, this IE shall contain the FQDN of the requester NF Service Consumer. This may be used by the NRF to validate that the requester NF service consumer is allowed to access the target NF Service Producer. (NOTE 3) |
| requesterSnpnList | array(PlmnId Nid) | O | 1 . . . N | When present, this IE shall contain the list of SNPNs the requester NF service consumer belongs to. This may be used by the NRF to validate that the requester NF service consumer is allowed to access the target NF Service Producer. (NOTE 3) |
| targetPlmn | PlmnId | C | 0 . . . 1 | This IE shall be included when the NF service consumer in one PLMN requests a service access authorization for an NF service producer from a different PLMN. When present, this IE shall contain the PLMN ID of the target PLMN (i.e., PLMN ID of the NF service producer). |
| targetSnssaiList | array(Snssai) | O | 1 . . . N | This IE may be included during an access token request for an NF type and not for a specific NF/NF service instance. When present, this IE shall contain the list of S-NSSAIs of the NF Service Producer. |
| targetNsiList | array(string) | O | 1 . . . N | This IE may be included during an access token request for an NF type and not for a specific NF/NF service instance. When present, this IE shall contain the list of NSIs of the NF Service Producer. |
| targetNfSetId | NfSetId | O | 0 . . . 1 | This IE may be included during an access token request for an NF type and not for a specific NF/NF service instance. When present, this IE shall contain the NF Set ID of the NF Service Producer. |
| targetNfServiceSetId | NfServiceSetId | O | 0 . . . 1 | This IE may be included during an access token request for a specific NF/NF service instance. When present, this IE shall contain the NF Service Set ID of the NF Service Producer. This may be used by the NRF to validate that the requester NF service consumer is allowed to access the target NF service instance. (NOTE 3) |

-continued

| Attribute name | Data type | P | Cardinality | Description |
|---|---|---|---|---|
| hnrfAccessTokenUri | Uri | C | 0 . . . 1 | If included, this IE shall contain the API URI of the Access Token Service (see clause 6.3.2) of the NRF in home PLMN. It shall be included during an access token request for an hSMF in the home routed roaming scenario, if it is returned from the NSSF in the home PLMN (see clause 6.1.6.2.11 of 3GPP TS 29.531 [42]). |
| targetAppids | array(string) | O | 1 . . . N | Indicates the target App ID(s) connected via NEF requested to be accessed |
| targetAfids | array(string) | O | 1 . . . N | Indicates the target AF ID(s) connected via NEF requested to be accessed |
| targetAfEvents | array(AfEvent) | O | 1 . . . N | Indicates the target AF exposure events IDs requested to be accessed |

The underlined attributes may be added to TS 29.510 v18.3.0 (section 6.3.5.2.2).

As described above, a NFc may receive a response to the request for an access token that authorizes access to a service provided by a NEF that provides data received from an untrusted AF connected to the NEF. The response comprises an access token. The access token may comprise the identifier associated with the untrusted AF that was included in the request for an access token that authorizes access to a service provided by a NEF that provides data from an untrusted AF connected to the NEF.

The response comprising an access token may be the data type "Access TokenClaims" in 3GPP TS 29.510 v18.3.0 (section 6.3.5.2.4).

The data type "AccessTokenClaims" may be as follows.

| Attribute name | Data type | P | Cardinality | Description |
|---|---|---|---|---|
| iss | NfInstanceId | M | 1 | This IE shall contain NF instance id of the NRF., corresponding to the standard "Issuer" claim described in IETF RFC 7519 [25], clause 4.1.1 |
| sub | NfInstanceId | M | 1 | This IE shall contain the NF instance ID of the NF service consumer, corresponding to the standard "Subject" claim described in IETF RFC 7519 [25], clause 4.1.2. |
| aud | Audience | M | 1 | This IE shall contain the NF service producer's NF instance ID(s) (if the exact NF instance(s) of the NF service producer is known) or the NF type of NF service producers for which the claim is applicable, corresponding to the standard "Audience" claim described in IETF RFC 7519 [25], clause 4.1.3. |
| scope | string | M | 1 | This IE shall contain the name of the NF services and the resource/operation-level scopes for which the access_token is authorized for use; this claim corresponds to a private claim, as described in IETF RFC 7519 [25], clause 4.3. pattern: '^([a-zA-Z0-9_:-]+)( [a-zA-Z0-9_:-]+)*$' |
| exp | integer | M | 1 | This IE shall contain the expiration time after which the access_token is considered to be expired, corresponding to the standard "Expiration Time" claim described in IETF RFC 7519 [25], clause 4.1.4. |
| consumerPlmnId | PlmnId | C | 0 . . . 1 | This IE shall be included if the NRF supports providing PLMN ID of the NF service consumer in the access token claims, to be interpreted for subject (sub IE), as specified in clause 13.4.1.2 of 3GPP TS 33.501 [15]. If an NF service producer that receives this IE in the token included in the authorization header does not understand this IE, it shall be ignored. |

-continued

| Attribute name | Data type | P | Cardinality | Description |
|---|---|---|---|---|
| producerPlmnId | PlmnId | C | 0 . . . 1 | This IE shall be included if the NRF supports providing PLMN ID of the NF service producer in the access token claims, to be interpreted for audience (aud IE), as specified in clause 13.4.1.2 of 3GPP TS 33.501 [15]. If an NF service producer that receives this IE in the token included in the authorization header does not understand this IE, it shall be ignored. |
| producerSnssaiList | array(Snssai) | O | 1 . . . N | This IE may be included if the NRF supports providing list of S-NSSAIs of the NF service producer in the access token claims. If an NF service producer that receives this IE in the token included in the authorization header does not understand this IE, it shall be ignored. |
| producerNsiList | array(string) | O | 1 . . . N | This IE may be included if the NRF supports providing list of NSIs of the NF service producer in the access token claims. If an NF service producer that receives this IE in the token included in the authorization header does not understand this IE, it shall be ignored. |
| producerNfSetId | NfSetId | O | 0 . . . 1 | This IE may be included if the NRF supports providing NF Set ID of the NF service producer in the access token claims and if the audience contains an NF type. When present, it shall indicate the NF Set ID of the NF service producer instances for which the claim is applicable. If an NF service producer that receives this IE in the token included in the authorization header does not understand this IE, it shall be ignored. |
| allowedAfIds | array(string) | O | 1 . . . N | When present, contains the allowed AF IDs the consumer is allowed to access |
| allowedAppIds | array(string) | O | 1 . . . N | When present, contains the allowed App IDs the consumer is allowed to access |
| allowedAfEventIds | array(AfEvent) | O | 1 . . . N | Indicates the target AF exposure events IDs permitted to be accessed |

The underlined attributes may be added to TS 29.510 v18.3.0 (section 6.3.5.2.4).

Figure 5:
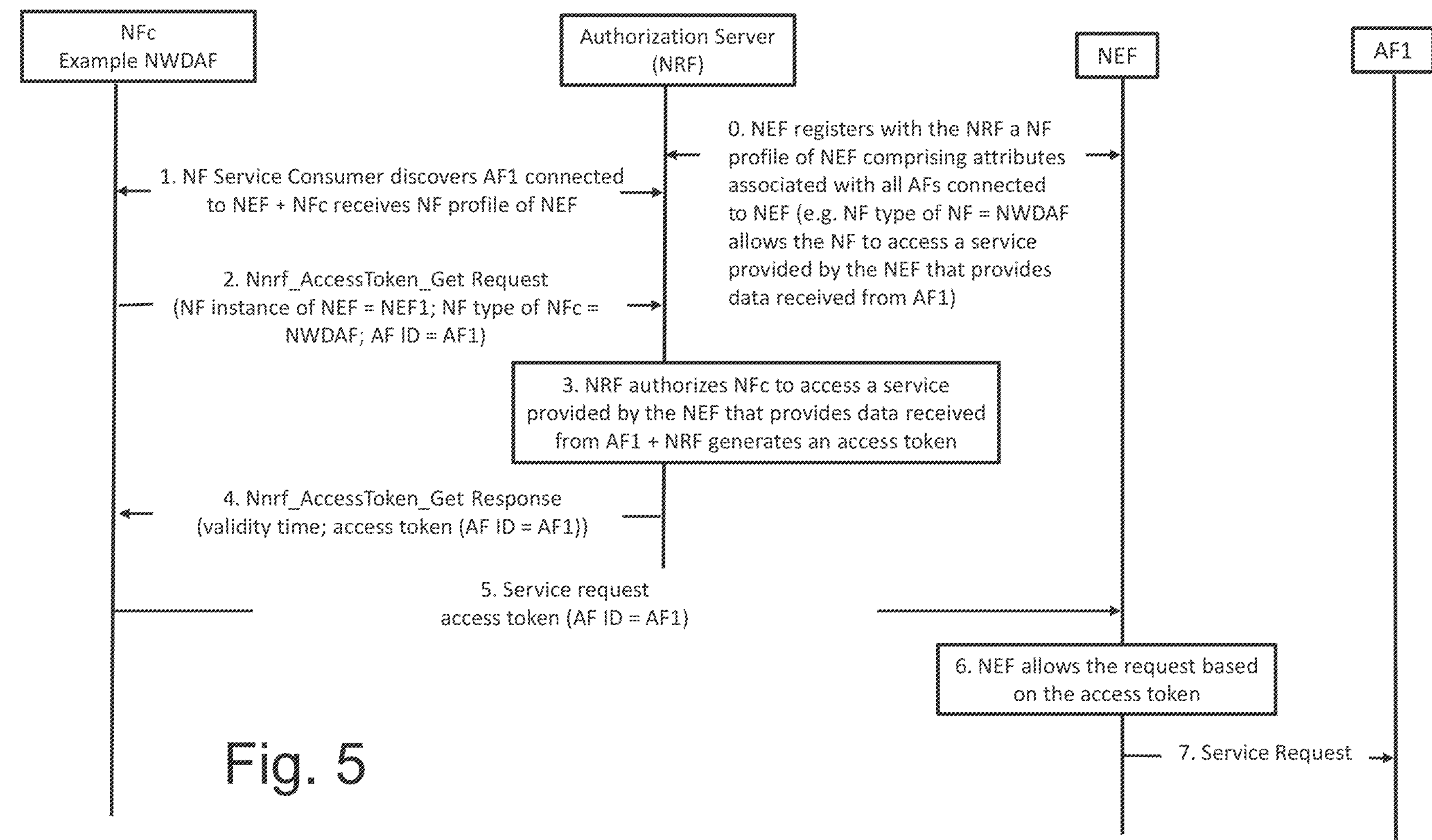
FIG. 5 shows a signalling diagram of a process for providing, to a network function service consumer, an access token that authorizes access to a service provided by a network exposure function using data from a specific application function connected to the network exposure function.

FIG. 5 shows a process for providing, to a Nfc, an access token that authorizes access to a service provided by a NEF that provides data received from a specific untrusted AF connected to the NEF.

At step 0, a NEF may send to an authorization server (e.g., NRF), a registration request to register a profile of the NEF. The profile of the NEF may include attributes associated with all untrusted AFs connected to the NEF. The untrusted AFs may include untrusted AF1 and untrusted AF2 (not illustrated).

The attributes associated with the untrusted AFs may comprise identifiers associated with the untrusted AFs. The identifiers associated with the untrusted AFs may comprise identifiers of the untrusted AFs (e.g., "afIds").

The attributes associated with the untrusted AFs may comprise identifiers associated with a NF that is allowed to access a service provided by the NEF. The identifiers associated with a NF that is allowed to access a service provided by the NEF may be mapped with the identifiers associated with the untrusted AFs. For example, each identifier associated with a NF that is allowed to access a service provided by the NEF is mapped to one or more identifiers associated with an untrusted AF.

The identifiers associated with a NF that is allowed to access a service provided by the NEF may comprise an identifier of a NF type of a NF that is allowed to access a service provided by the NEF (e.g. "allowedNFtypes"), an identifier of a NF instance of a NF that is allowed to access a service provided by the NEF (e.g. "allowedNFInstances"), an identifier of a NF domain of a NF that is allowed to access a service provided by the NEF (e.g. "allowedNFDomains") or an identifier of a single network slice selection assistance information (S-NSSAI) that identifies a network slice of a NF that is allowed to access a service provided by the NEF (e.g. "allowedNssais)".

At step 1, a NFc may send, to the authorization server (e.g., NRF), a request to discover the untrusted AFs connected to the NEF. The request may comprise an identifier associated with the NEF and an identifier associated with the NFc. The identifier associated with the NEF may comprise an identifier of an NF instance of the NEF. The identifier associated with the NFc may comprise an identifier of an NF instance of the NFc. The NRF may provide, to the NFc, the profile of the NEF.

At step 2, the NFc may send, to the authorization server (e.g., NRF), a request for an access token that authorizes access to a service provided by the NEF that provides data obtained from one of the untrusted AFs discovered in step 1 (e.g., untrusted AF1). The request may comprise an identifier associated with the NEF and an identifier associated with the NFc. The identifier associated with the NEF may comprise an identifier of an NF instance of the NEF. The identifier associated with the NFc may comprise an identifier of an NF instance of the NFc, an identifier of an NF type of the NFc an identifier of a NF domain of the NFc or an identifier of a NF slice of the NFc. The request may further comprise an identifier associated with the untrusted AF. The identifier associated with the untrusted AF may comprise an identifier of the untrusted AF, an identifier of an application supported by the untrusted AF or an identifier of an event relating to the untrusted AF. The request may be a Nnrf_Access_Token_Get_Request.

In some embodiments, the NF may be a NWDAF and the NF type of the NFc may indicate that the NF is a NWDAF. More generally, a NFc may be any NF of a wireless communication system (e.g., a core network of a wireless communication system) and a NF type of a NF may indicate that the NF is a NSSF, NRF, a PCF, a UDM, UDR, AUSF, AMF, SMF, NWDAF as illustrated in FIG. 1, or another NF not illustrated in FIG. 1.

The identifier of an untrusted AF may identify a specific untrusted AF. The identifier of an application supported by an untrusted AF may identify a specific application supported by an untrusted AF. The identifier of an event relating to an AF may identify a specific event relating to an untrusted AF.

For example, the NFc may send, to the NRF, a request for an access token that authorizes access to a service provided by the NEF, wherein the service provides data obtained from the untrusted AF1.

The data obtained from the untrusted AF may for example comprise UE data related to observed service experience or other data.

At step 3, the authorization server (e.g., NRF) may authorize the NFc to access the service provided by the NEF using the identifier associated with the NEF, the identifier associated with the NFc, the identifier associated with the untrusted application function, and the profile of the NEF stored at the authorization server (e.g., NRF). The authorization server (e.g., NRF) may retrieve the profile of the NEF stored at the authorization server (e.g., NF) and use the identifier associated with the NEF, the identifier associated with the NFc, and the identifier associated with the untrusted application function to determine if the NFc is authorized to access a service of the NEF that provides data obtained from the untrusted application function identified by the identifier associated with the untrusted application function. The authorization server (e.g., NRF) determines the NFc is authorized to access a service of the NEF that provides data obtained from the untrusted application function identified by the identifier associated with the untrusted application function when the identifier associated with the NEF, the identifier associated with the NFc, the identifier associated with the untrusted application function match the attributes of the profile of the NEF.

For example, the NRF may authorize the NFc to access the service provided by the NEF using the identifier associated with the untrusted AF1.

At step 4, the NRF may provide, to the NFc, in a response to the request for an access token, the access token. The access token comprises the identifier associated with the untrusted AF, wherein the identifier associated with the untrusted AF is the identifier of the untrusted AF, the identifier of an application supported by the untrusted AF or the identifier of an event relating to the untrusted AF. The response may also comprise a validity time associated with the access token. The response may be a Nnrf_Access_Token_Get_Response For example, the access token comprises the identifier of the untrusted AF1.

At step 5, the NFc may provide, to the NEF, a request for the service provided the NEF. The request for the service (generally referred to herein a service request) comprises the access token. The service provided by the NEF provides data obtained from the untrusted AF connected to the NEF. The data obtained from the untrusted AF may be data received the untrusted AF, data received from a specific application supported by the specific untrusted AF connected to the NEF or data related to a specific event relating to the untrusted AF.

At step 6, the NEF may determine to allow the service request based on the access token, thereby allowing the NEF to provide data obtained from the untrusted AF to the NFc.

The NEF may determine to allow the service request based on the access token by determining that the identifier of the untrusted AF, the identifier of an application supported by the untrusted AF or the identifier of an event relating to the AF comprised in the access token matches an identifier of an untrusted AF, an identifier of an application supported by an untrusted AF or an identifier of an event relating to an untrusted AF stored at the NEF.

In this way, the NEF may determine that a specific untrusted AF connected to the NEF, a specific application supported by an untrusted AF connected to the NEF or a specific event relating to an untrusted AF connected to the NEF is identified in the access token.

For example, the NEF may determine that the untrusted AF1 is identified in the access token. The NEF may determine that the untrusted AF2 is not identified in the access token.

At step 7, the NEF may send, to the specific untrusted AF connected to the NEF, a service request for a service provided (e.g., produced and exposed by) the specific untrusted AF). The service request may be Naf_EventExposure service request or another service request. The service requested by the NEF provides the data that the service of the NEF provides to the NFc. The data the service of the NEF provides to the NFc that is provided by the untrusted AF to the NEF may be data received from the specific unsupported AF, data received from a specific application supported by an untrusted AF, data associated with a specific event relating to the untrusted AF.

The NEF may provide, to the NFc, data from the specific untrusted AF connected to the NEF, the specific application supported by an untrusted AF connected to the NEF or the specific event relating to an untrusted AF connected to the NEF.

For example, the NEF may send, to the AF1, a service request for data. The NEF may provide, to the NFc, the service using the data from the untrusted AF1. The NEF may not send, to the AF2, a service request for data. The NEF may not provide, to the NFc, the service using the data from the AF2.

Figure 6:
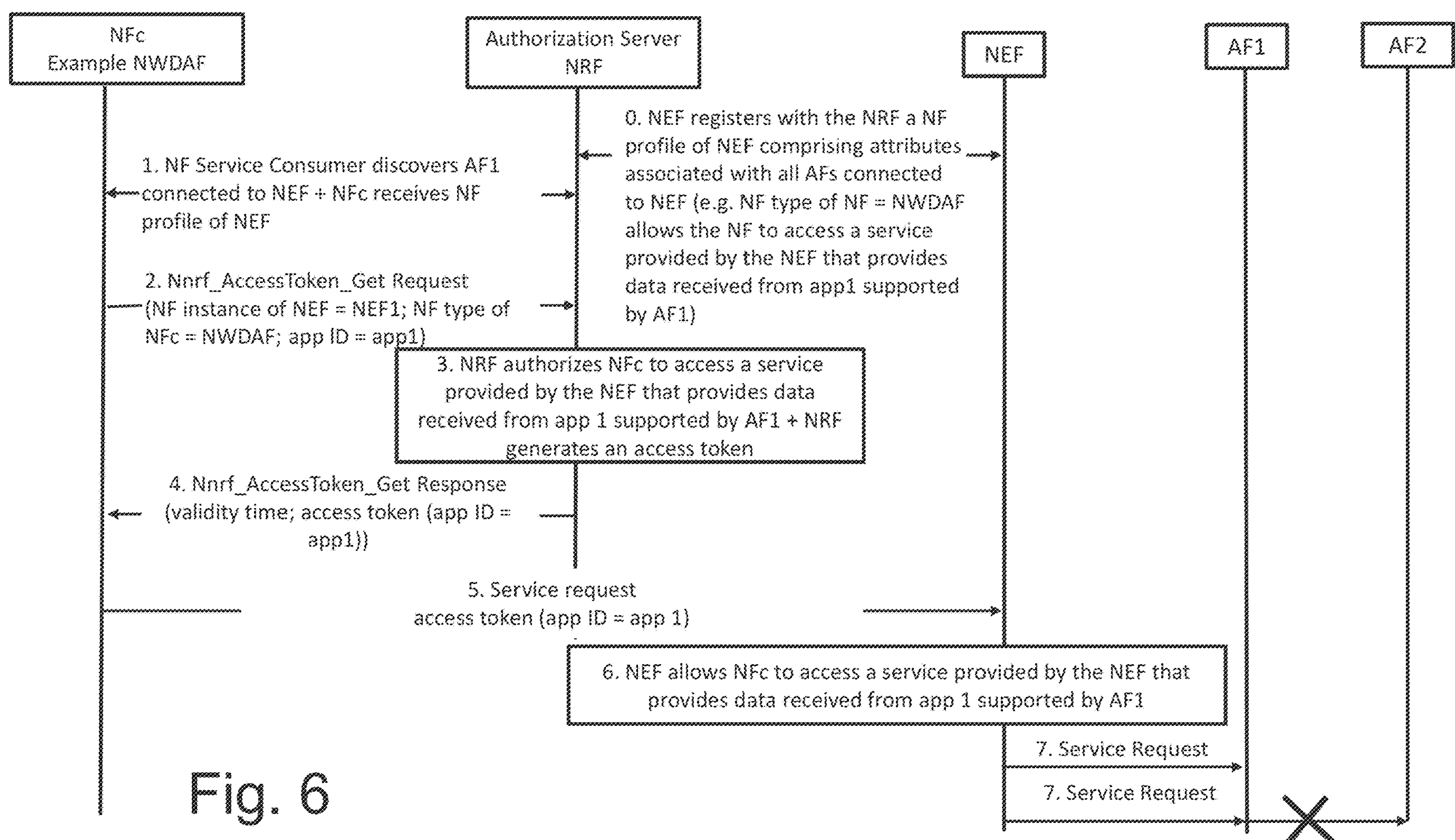
FIG. 6 shows a signalling diagram of a process for providing, to a network function service consumer, an access token that authorizes access to a service provided by a network exposure function using data from a specific application supported by an application function connected to the network exposure function.

FIG. 6 shows a process for providing, to a NFc, an access token that authorizes access to a service provided by a NEF that provides data from an application supported by an untrusted AF connected to the NEF.

At step 0, a NEF may send to an authorization server (e.g., NRF), a registration request to register a profile of the NEF. The profile of the NEF may include attributes associated with all untrusted AFs connected to the NEF. The untrusted AFs may include untrusted AF1 and untrusted AF2 (not illustrated).

The attributes associated with the untrusted AFs may comprise identifiers associated with the untrusted AFs. The identifiers associated with the untrusted AFs may comprise identifiers of the untrusted AFs (generally referred to and shown as "afIds" herein), identifiers of applications supported by the untrusted AFs (generally referred to and shown as "appIds" herein) or identifiers of events relating to the untrusted AFs (e.g., afeIds).

The attributes associated with the untrusted AFs may comprise identifiers associated with a NF that is allowed to access a service provided by the NEF. The identifiers associated with a NF that is allowed to access a service provided by the NEF may be mapped with the identifiers associated with the untrusted AFs. For example, each identifier associated with a NF that is allowed to access a service provided by the NEF is mapped to one or more identifiers associated with an untrusted AF.

The identifiers associated with a NF that is allowed to access a service provided by the NEF may comprise an identifier of a NF type of a NF that is allowed to access a service provided by the NEF (e.g. "allowedNFtypes"), an identifier of a NF instance of a NF that is allowed to access a service provided by the NEF (e.g. "allowedNFInstances"), an identifier of a NF domain of a NF that is allowed to access a service provided by the NEF (e.g. "allowedNFDomains") or an identifier of a single network slice selection assistance information (S-NSSAI) that identifies a network slice of a NF that is allowed to access a service provided by the NEF (e.g. "allowedNssais)".

At step 1, a NFc may send, to the authorization server (e.g., NRF), a request to discover the untrusted AFs connected to the NEF. The request may comprise an identifier associated with the NEF and an identifier associated with the NFc. The identifier associated with the NEF may comprise an identifier of an NF instance of the NEF. The identifier associated with the NFc may comprise an identifier of an NF instance of the NFc. The NRF may provide, to the NFc, the profile of the NEF.

At step 2, the NFc may send, to the authorization server (e.g., NRF), a request for an access token that authorizes access to a service provided by the NEF that provides data obtained from one of the untrusted AFs discovered in step 1 (e.g., untrusted AF1). The request may comprise an identifier associated with the NEF and an identifier associated with the NFc. The identifier associated with the NEF may comprise an identifier of an NF instance of the NEF. The identifier associated with the NFc may comprise an identifier of an NF instance of the NFc, an identifier of an NF type of the NFc an identifier of a NF domain of the NFc or an identifier of a NF slice of the NFc. The request may further comprise an identifier associated with the untrusted AF. The identifier associated with the untrusted AF may comprise an identifier of the untrusted AF, an identifier of an application supported by the untrusted AF or an identifier of an event relating to the AF.

In some embodiments, the NF may be a NWDAF and the NF type of the NFc may indicate that the NF is a NWDAF. More generally, a NFc may be any NF of a wireless communication system (e.g., a core network of a wireless communication system) and a NF type of a NF may indicate that the NF is a NSSF, NRF, a PCF, a UDM, UDR, AUSF, AMF, SMF, NWDAF as depicted in FIG. 1 or another NF not illustrated in FIG. 1.

The identifier of an untrusted AF may identify a specific AF. The identifier of an application supported by an untrusted AF may identify a specific application supported by an untrusted AF. The identifier of an event relating to an untrusted AF may identify a specific event relating to an untrusted AF.

For example, the NFc may send, to the NRF, a request for an access token that authorizes access to a service provided by the NEF, wherein the service provides data obtained from the app1 that is supported by the AF1.

At step 3 the authorization server (e.g., NRF) may authorize the NFc to access the service provided by the NEF using the identifier associated with the NEF, the identifier associated with the NFc, and the identifier associated with the untrusted application function and the profile of the NEF stored at the authorization server (e.g., NRF). The authorization server (e.g., NRF) may retrieve the profile of the NEF stored at the authorization server (e.g., NF) and use the identifier associated with the NEF, the identifier associated with the NFc, and the identifier associated with the untrusted application function to determine if the NFc is authorized to access a service of the NEF that provides data obtained from the untrusted application function identified by the identifier associated with the untrusted application function. The authorization server (e.g., NRF) determines the NFc is authorized to access a service of the NEF that provides data obtained from the untrusted application function identified by the identifier associated with the untrusted application function when the identifier associated with the NEF, the identifier associated with the NFc, the identifier associated with the untrusted application function match the attributes of the profile of the NEF.

For example, the NRF may authorize the NFc to access the service provided by the NEF using data from the app1 supported by untrusted AF1.

At step 4, the NRF may provide, to the NFc, a response comprising an access token. The access token comprises the identifier of the untrusted AF, the identifier of an application supported by the untrusted AF or the identifier of an event relating to the untrusted AF comprised in the request for the access token. The response may comprise a validity time associated with the access token.

For example, the access token comprises the identifier of the app1 supported by the untrusted AF1.

At step 5, the NFc may provide, to the NEF, a request for the service provided the NEF that provides data received from specific AF connected to the NEF, a specific application supported by an AF connected to the NEF or a specific event relating to an AP connected to the NEF. The request may comprise the access token.

At step 6, the NEF may determine to allow the request for the service.

The NEF may determine that the identifier of the untrusted AF, the identifier of an application supported by the untrusted AF or the identifier of an event relating to the untrusted AF comprised in the access token matches an identifier of an untrusted AF, an identifier of an application supported by an untrusted AF or an identifier of an event relating to an untrusted AF stored at the NEF.

In this way, the NEF may determine that a specific untrusted AF connected to the NEF, a specific application supported by an untrusted AF connected to the NEF or a specific event relating to an untrusted AF connected to the NEF is identified in the access token.

For example, the NEF may determine that the app1 supported by the untrusted AF1 is identified in the access token. The NEF may determine that the app2 supported by the untrusted AF2 is not identified in the access token.

At step 7, the NEF may send, to the specific untrusted AF connected to the NEF, a service request for a service that obtains and provides data the service of the NEF provides to the NFc. The data the service of the NEF provides to the NFc that is provided by the untrusted AF to the NEF may be data received from the specific untrusted AF, data received from a specific application supported by the untrusted AF, data associated with a specific event relating to the untrusted AF. The service request may for example be a Naf_EventExposure service request or another service request.

The NEF may provide, to the NFc, the data obtained from the specific untrusted AF connected to the NEF, where the specific application supported by an untrusted AF connected to the NEF or the specific event relating to an untrusted AF connected to the NEF identified in the access token.

For example, the NEF may send to the untrusted AF1 supporting the app1, a service request for data. The NEF may provide, to the NFc, the service using the data from the app1 supported by the untrusted AF1. The NEF may not send, to the untrusted AF2 supporting the app2, a service request for data. The NEF may not provide, to the NFc, the service using the data from the app2 supported by the untrusted AF2.

FIG. 7 shows a method for providing, to a NFc, an access token that authorizes access to a service provided by a NEF, wherein the method is performed by a NRF.

At step 700, the NRF may receive, from a NFc, a request for an access token that authorizes access to a service provided by a NEF that provides data received from an untrusted AF connected to the NEF. The request may comprise an identifier associated with the NEF, an identifier associated with the NFc and an identifier associated with the untrusted AF.

At step 702, the NRF may determine to provide an access token to the NFc based on the identifier associated with the NEF, the identifier associated with the NFc, the identifier associated with the untrusted AF and attributes associated with the untrusted AF included in a profile of the NEF stored at the NRF.

At step 704, the NRF may provide, to the NFc, the access token comprising the identifier associated with the untrusted AF comprised in the request.

Figure 8:
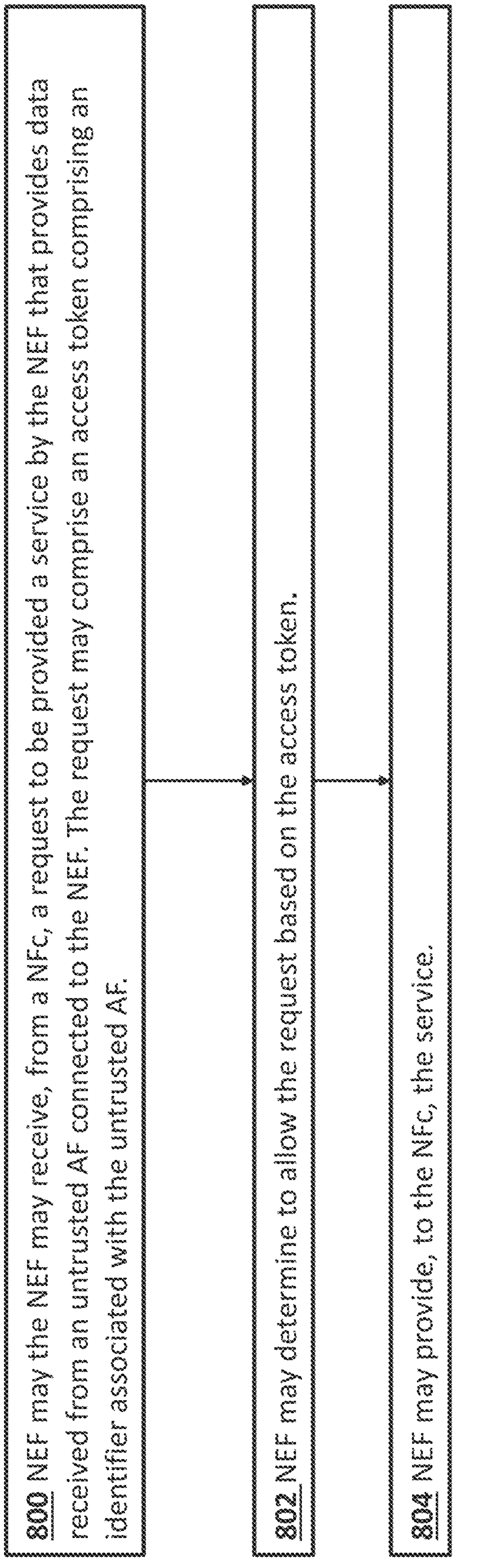
FIG. 8 shows a method for providing, to a network function service consumer, an access token that authorizes access to a service provided by a network exposure function, wherein the method is performed by the network exposure function.

FIG. 8 shows a method for providing, to a NFc, an access token that authorizes access to a service provided by a NEF, wherein the method is performed by the NEF.

At step 800, the NEF may receive, from a NFc, a request to be provided a service by the NEF that provides data received from an untrusted AF connected to the NEF. The request may comprise an access token comprising an identifier associated with the untrusted AF. At step 802, the NEF may determine to allow the request based on the access token.

At step 804, the NEF may provide, to the NFc, the service.

Figure 9:
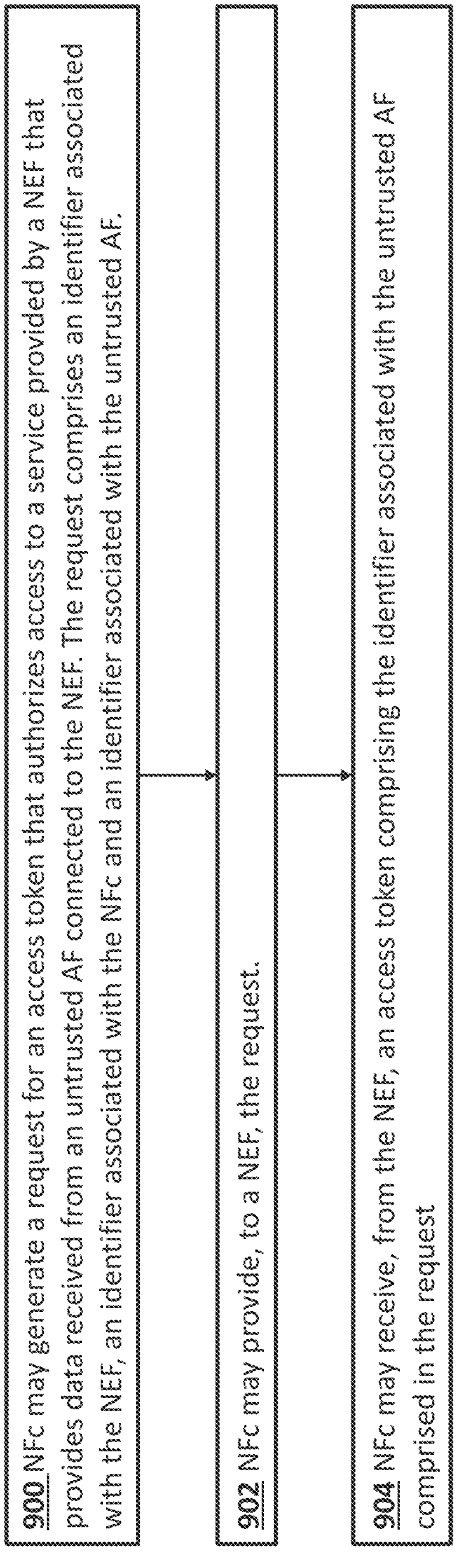
FIG. 9 shows a method for providing, to a network function service consumer, an access token that authorizes access to a service provided by a network exposure function, wherein the method is performed by the network function service consumer.

FIG. 9 shows a method for providing, to a NFc, an access token that authorizes access to a service provided by a NEF, wherein the method is performed by the NFc.

At step 900, the NFc may generate a request for an access token that authorizes access to a service provided by a NEF that provides data received from an untrusted AF connected to the NEF. The request comprises an identifier associated with the NEF, an identifier associated with the NFc and an identifier associated with the untrusted AF.

At step 902, the NFc may provide, to a NEF, the request.

At step 904, the NF may receive, from the NEF, an access token comprising the identifier associated with the untrusted AF comprised in the request.

Figure 10:
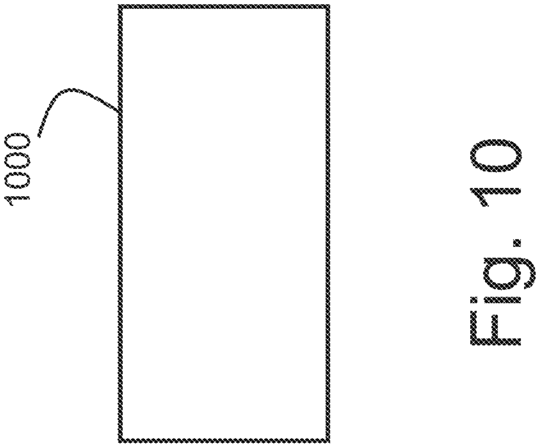
FIG. 10 shows a schematic representation of a non-volatile memory medium storing instructions which when executed by a processor allow a processor to perform one or more of the steps of the methods of FIG. 7, FIG. 8 and FIG. 9.

FIG. 10 shows a schematic representation of non-volatile memory media storing instructions which when executed by a processor allow the processor to perform one or more of the steps of the methods of FIG. 7, FIG. 8 and FIG. 9.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 7, FIG. 8 and FIG. 9, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. The circuitry may be provided in a base station and/or in a user equipment.

As used in this application, the term "circuitry" may refer to one or more or all of the following:

(a) hardware-only circuits (such as only analogue and/or digital circuits);

(b) combinations of hardware circuits and software, such as:

(i) a combination of analogue and/or digital hardware circuit(s) with software/firmware and (ii) any portions of hardware processor(s) with software (including digital signal processor(s)), software, and memory (ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term "means" in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A method of a network repository function of a communication network, the method comprising:

receiving, from a network function service consumer, a request for access token that authorizes access to a service provided by a network exposure function, wherein the service provides data obtained from an untrusted application function connected to the network exposure function, wherein the request comprises an identifier associated with the network exposure function, an identifier associated with the network function service consumer and an identifier associated with the untrusted application function;

determining, in response to the request, to provide an access token to the network function service consumer based on the identifier associated with the network exposure function, the identifier associated with the network function service consumer, the identifier associated with the untrusted application function, and attributes associated with the untrusted application function included in a profile of the network exposure function stored at a network repository function, wherein the attributes associated with the untrusted application function included in the profile of the network exposure function comprise:

an identifier associated with the untrusted application function; and an identifier associated with a network function that is allowed to access the service corresponding to the identifier associated with the untrusted application function, wherein the determining comprises:

determining that the identifier associated with the network function service consumer comprised in the request matches the identifier associated with the untrusted application function comprised in the attributes associated with the untrusted application function included in the profile of the network exposure function;

determining that the identifier associated with the untrusted application function comprised in the request matches the identifier associated with the network function that is allowed to access the service corresponding to the identifier associated with the untrusted application function comprised in the attributes associated with the untrusted application function included in the profile of the network exposure function; and providing to the network function service consumer, the access token, the access token comprising the identifier associated with the untrusted application function comprised in the request.

2. The method as claimed in claim 1, further comprising:

receiving, from the network exposure function, a registration request to register the profile of the network exposure function, the profile of the network exposure function including the attributes associated with the untrusted application function.

3. The method as claimed in claim 1, wherein the identifier associated with the network function that is allowed to access the service comprises:

an identifier of a network function type of the network function that is allowed to access the service;

an identifier of a network function instance of the network function that is allowed to access the service;

an identifier of a network function domain of the network function that is allowed to access the service; or an identifier of single network slice selection assistance information that identifies a network slice of network functions that are allowed to access the service.

4. The method as claimed in claim 1, wherein the identifier associated with the untrusted application function comprises:

an identifier of the untrusted application function;

an identifier of an application supported by the untrusted application function; or an identifier of an event relating to the untrusted application function.

5. The method as claimed in claim 1, wherein the identifier associated with the network exposure function comprises:

an identifier of a network function instance of the network exposure function.

6. The method as claimed in claim 1, further comprising:

generating, by the network repository function, the access token.

7. An apparatus for a communication network, the apparatus comprising:

at least one processor; and at least one memory storing instructions of a network repository function, wherein the instructions, when executed by the at least one processor, cause the apparatus at least to perform:

receiving, from a network function service consumer, a request for access token that authorizes access to a service provided by a network exposure function that provides data received from an untrusted application function connected to the network exposure function, wherein the request comprises an identifier associated with the network exposure function, an identifier associated with the network function service consumer and an identifier associated with the untrusted application function;

determining, in response to the request, to provide an access token to the network function service consumer based on the identifier associated with the network exposure function, the identifier associated with the network function service consumer, the identifier associated with the untrusted application function and attributes associated with the untrusted application function included in a profile of the network exposure function stored at the network repository function, wherein the attributes associated with the untrusted application function included in the profile of the network exposure function comprise:

an identifier associated with the untrusted application function; and an identifier associated with a network function that is allowed to access the service corresponding to the identifier associated with the untrusted application function, wherein the determining comprises:

determining that the identifier associated with the network function service consumer comprised in the request matches the identifier associated with the untrusted application function comprised in the attributes associated with the untrusted application function included in the profile of the network exposure function; and determining that the identifier associated with the untrusted application function comprised in the request matches the identifier associated with the network function that is allowed to access the service corresponding to the identifier associated with the untrusted application function comprised in the attributes associated with the untrusted application function included in the profile of the network exposure function; and providing, to the network function service consumer, the access token comprising the identifier associated with the untrusted application function comprised in the request.

8. The apparatus as clamed in claim 7, wherein the instructions, when executed by the at least one processor, further cause the apparatus at least to perform:

receiving from the network exposure function, a registration request to register the profile of the network exposure function, the profile of the network exposure function including the attributes associated with the untrusted application function.

9. The apparatus as claimed in claim 7, wherein the identifier associated with the network function that is allowed to access the service comprises:

an identifier of a network function type of the network function that is allowed to access the service;

an identifier of a network function instance of the network function that is allowed to access the service;

an identifier of a network function domain of the network function that is allowed to access the service; or an identifier of single network slice selection assistance information that identifies a network slice of network functions that are allowed to access the service.

10. The apparatus as claimed in claim 7, wherein the identifier associated with the untrusted application function comprises:

an identifier of the untrusted application function;

an identifier of an application supported by the untrusted application function; or an identifier of an event relating to the untrusted application function.

11. The apparatus as claimed in claim 7, wherein the identifier associated with the network exposure function comprises:

an identifier of a network function instance of the network exposure function.

12. The apparatus as claimed in claim 7, wherein the instructions which, when executed by the at least one processor, further cause the apparatus at least to perform:

generating the access token.

13. An apparatus for a communication network, the apparatus comprising:

at least one processor; and at least one memory storing instructions of a network exposure function, wherein the instructions, when executed by the at least one processor, cause the apparatus at least to perform:

receiving, from a network function service consumer, a request for a service provided by the network exposure function, wherein the service configured to provide data obtained from an untrusted application function connected to the network exposure function, wherein the request comprises an access token comprising an identifier associated with the untrusted application function; and determining to allow the request based on the access token;

identifying the untrusted application function based on the identifier associated with the untrusted application function comprised in the access token;

providing, to the untrusted application function, a request for data;

obtaining, from the untrusted application function, data; and providing, using the service, the data obtained from the untrusted application function to the network function service consumer.

14. The apparatus as claimed in claim 13, wherein the instructions, when executed by the at least one processor, cause the apparatus at least to perform:

providing to a network repository function, a registration request to register a profile of the network exposure function, the profile of the network exposure function including attributes associated with the untrusted application function.

* * * * *